US012131421B2

(12) United States Patent
Mahmood et al.

(10) Patent No.: US 12,131,421 B2
(45) Date of Patent: Oct. 29, 2024

(54) CROPPING FOR EFFICIENT THREE-DIMENSIONAL DIGITAL RENDERING

(71) Applicant: Adobe Inc., San Jose, CA (US)

(72) Inventors: Kowsheek Mahmood, North York (CA); Kevin Roan, Amsterdam (NL); David McKinley Cardwell, Toronto (CA)

(73) Assignee: Adobe Inc., San Jose, CA (US)

( * ) Notice: Subject to any disclaimer, the term of this patent is extended or adjusted under 35 U.S.C. 154(b) by 13 days.

(21) Appl. No.: 18/083,796

(22) Filed: Dec. 19, 2022

(65) Prior Publication Data

US 2023/0274494 A1    Aug. 31, 2023

Related U.S. Application Data

(60) Provisional application No. 63/314,169, filed on Feb. 25, 2022.

(51) Int. Cl.
| | |
|---|---|
| *G06T 15/08* | (2011.01) |
| *G06T 15/50* | (2011.01) |
| *G06T 19/00* | (2011.01) |

(52) U.S. Cl.
CPC ............. *G06T 15/08* (2013.01); *G06T 15/50* (2013.01); *G06T 19/00* (2013.01); *G06T 2210/22* (2013.01); *G06T 2219/004* (2013.01)

(58) Field of Classification Search
None
See application file for complete search history.

(56) References Cited

U.S. PATENT DOCUMENTS

| | | |
|---|---|---|
| 2021/0299560 A1 | 9/2021 | Shen |
| 2022/0005258 A1* | 1/2022 | Mory ................... A61B 6/5223 |
| 2024/0013492 A1* | 1/2024 | Tahara ...................... G06T 7/73 |

FOREIGN PATENT DOCUMENTS

JP    2018181047 A    11/2018

OTHER PUBLICATIONS

Mildenhall, Ben, et al., NeRF: Representing Scenes as Neural Radiance Fields for View Synthesis, Communications of the ACM, vol. 65, No. 1,, https://cacm.acm.org/magazines/2022/1/257450-nerf/fulltext, Jan. 2022, pp. 99-106.

(Continued)

*Primary Examiner* — Frank S Chen
(74) *Attorney, Agent, or Firm* — Kilpatrick Townsend & Stockton LLP

(57) ABSTRACT

A method for generating a volume for three-dimensional rendering extracts a plurality of images from a source image input, normalizes the extracted images to have a common pixel size, and determines a notional camera placement for each normalized image to obtain a plurality of annotated normalized images, each annotated with a respective point of view through the view frustum of the notional camera. From the annotated normalized images, the method generates a first volume encompassing a first three-dimensional representation of the target object and selects a smaller subspace within the first volume that encompasses the first three-dimensional representation of the target object. The method generates, from the annotated normalized images, a second volume overlapping the first volume, encompassing a second three-dimensional representation of the target object and having a plurality of voxels, and crops the second volume to limit the second volume to the subspace.

20 Claims, 14 Drawing Sheets

(56) References Cited

OTHER PUBLICATIONS

Yu, Alex, et al., PlenOctrees for Real-Time Rendering of Neural Radiance Fields, Computer Vision and Pattern Recognition, arXiv:2103.14024, https://arxiv.org/pdf/2103.14024.pdf, Aug. 2021, pp. 1-10.
Yu, Alex, et al., PlenOctrees Official Repo: NeRF-SH Training and Conversion, available at https://github.com/sxyu/plenoctree, Aug. 2021, accessed Dec. 19, 2022, pp. 1-7.
GB Application No. GB2302723.8 Combined Search and Examination Report, Sep. 4, 2023, 6 pages.
Shrestha, Rakesh, et al., "A Real World Dataset for Multi-View 3D Reconstruction", European Conference on Computer Vision, Available at https://link.springer.com/chapter/10.1007/978-3-031-20074-8_4, Nov. 12, 2022, pp. 56-73.

* cited by examiner

200

```
23 lines (18 sloc) | 502 Bytes
 1  import math
 2  import maya.cmds as cmds
 3  import maya.OpenMaya as OpenMaya
 4  import maya.OpenMayaUI as OpenMayaUI
 5  from maya.api.OpenMaya import MVector, MMatrix, MPoint
 6  import maya.cmds as cmds
 7
 8  f = open("D:\\campose.txt", "w"_
 9
10  import maya.cmds as cmds
11
12  # Get all cameras first
13  cameras = cmds.ls( 'camera1' )
14  print(type)cameras[0]))
15
16  for frame in range(0,151):
17      cmds.currentTime(frame)
18      att = cameras[0]+".worldMatrix"
19      wm = cmds.getAttr(att)
20      print( wm )
21      f.write( str(wm) + '\n')
22
23  f.close()
```

```
 2
 3   import cv2
 4   import os
 5
 6   import argparse
 7
 8   from numpy.core.fromnumeric import shape
 9   parser = argparse.ArgumentParser()
10   parser.add_argument('inputdir', type=str,
11                      help='input image directory')
12   parser.add_argument('--factor', type=float,
13                      help='integer downsampling factor for input images')
14   parser.add_argument('outputdir', type=str,
15                      help='output image directory')
16   args = parser.parse_args()
17
18   def gen_resize(inoutdir, outputdir, factor):
19       for filename in os.listdir(inputdir):
20           inputfilepath = os.path.join(inoutdir, filename)
21           print('processing ', inputfilepath)
22           img = cvw.imread( inputfilepath, cv2.IMREAD_UNCHANGED )
23
24           if img is None:
25               continue
26
27   #         print('img.shape: ', img, img.shape)
28
29           print('before.cropped : ', img.shape)
30
31           offset = (img.shape[1] - img.shape[0]) / 2
32           offset = int(offset)
33           print('crop offset :', offset)
34           img = img[0:img.shape[0], offset:img.shape[1]-offset]
35
36           print('cropped : ', img.shape)
37
38           width = int(img.shape[1] / factor)
39           height = int(img.shape[1] / factor)
40           dim = (800, 800)
41
42           resized = cv2.resize)img, dim, interpolation = cv2.INTER_AREA)
43
44           print('Resized : ', filename, img.shape, resized.shape)
45
46           outputfilepath = os.path.join(outputdir, filename)
47           cv2.imwrite( outputfilepath, resized)
48           print('processed ', outputfilepath)
49
50   if __name__ == '__main__':
51       print( args )
52       try:
53           os.mkdir(args.outputdir)
54       except:
55           pass
56       gen_resize(args.inputdir, args.outputdir, args.factor)
```

```
In [3]: prefix = 'sagemaker-studio-hx4pedomtjl' import boto3
        import re import os
        import numpy as np
        import pandas as pd
        from sagemaker import get_execution_role role = get_execution_role()

import sagemaker as sage
        from time import gmtime, strftime sess = sage.session()

account = sess.boto_session.client('sts').get_caller_identity()['Account']
        region = sess.boto_session.region_name
        image = '{}.dkr.ecr.{}.amazonaws.com/sagemaker-calc-pose:latest'.format(account,region)

endpoint="s3://{}/output".format(sess.default_bucket())

tree = sage.estimator.Estimator(image,
                        role, instance_count=1, instance_type='ml.p3.2xlarge',
                        output_path="s3://{}/output".format(sess.default_bucket()),
                        sagemaker_session=sess)
        #,
        #                    inout_mode = 'FastFile' tree.fit('s3://sagemaker-studio-hx4pedomtjl/inputs/furAndShineVideo.mov')
```

```
# %%sh

!chmod +x calcpose/train
!chmod +x Calcpose/serve
!sm-docker build . --repository sagemaker-calc-pose:latest
```

```
import time
from sagemaker import get_execution_role
import sagemaker as sage start_time = time.time()

prefix = 'sagemaker-studio-hx4pedomtjl' role = get_execution_role()

sess = sage.Session()

account = sess.boto_session.client('sts').get_caller_identify()['Account']
region = sess.boto_session.region_name
image = '{}.dkr.ecr.{}.amazonaws.com/sagemaker-ml-voxel'.format(account, region)

output_path="s3://{}/output".format(sess.default_bicket())

tree = sage.estimator.Estimator(
    image,
    role,
    instance_count=1,
    instance_type='ml.p3.2xlarge',
    output_path=output_path,
    sagemaker_session=sess)
# ,
input_mode = 'FastFile' tree.fit('s3://sagemaker-studio-hx4pedpmtjl/training_results/AudioSpeaker_ckp.zip')

@ StreetFighter.zip
duration = (time.time() - start_time)/60 print( "--- training hours : %s minutes ---" % duration )
```

```
!pip install sagemaker-studio-image-build
```

```
1   import boto3
2   import re
3   import os
4   import numpy as np
5   import pandas as pd
6   from sagemaker import
7   import sagemaker as sage
8   from time import gmtime, strftime
9
10  prefix = 'sagemaker-studio-hx4pedomtjl"
11
12  role = get_exectution_role()
13
14  sess = sage.session()
15
16  # Cell #6
17
18  # WORK_DIRECTORY = 'lab03_data'
19
20  # data_location = sess.upload_data(WORK_DIRECTORY, key_prefix=prefix)
21
22  # Cell #7
23
24  account = sess.boto_session.client('sts').get_call_identity()['Account']
25  region = sess.boto_session.region_name
26  image = '{}.dkr.ecr.{}.amazonaws.com/sagemaker-ml-render'.format(account, region)
27
28  output_path="s3://{}/output".format(sess.default_bucket())
29
30  print( account )
31  print( region )
32  print( image )
33  print( output_path )
34  # print( data_location )
35
36
37  tree = sage.estimator.Estimator(
38      image,
39      role,
40      instance_count=1,
41      instance_type='ml.g4dn.xlarge',
42      output_path=output_path,
43      sagemaker_session=sess)
44
45  # p4d.24xlarge
46  # p3.16xlarge
47  # p3dn.24xlarge
48  # p3.16xlarge
49
50
51  tree.fit('s3://sagemaker-studio-hx4pedomtjl/inputs/vaseOutDoorsFull.zip')
```

```
import time
from sagemaker import get_execution_role
import sagemaker as sage start_time = time.time()

prefix = 'sagemaker-studio-hx4pedomtjl' role = get_execution_role()

sess = sage.Session()

account = sess.boto_session.client('sts').get_caller_identify()['Account']
region = sess.boto_session.region_name
image = '{}.dkr.ecr.{}.amazonaws.com/sagemaker-ml-voxel'.format(account, region)

output_path="s3://{}/output".format(sess.default_bicket())

tree = sage.estimator.Estimator(
    image,
    role,
    instance_count=1,
    instance_type='ml.p3.2xlarge',
    output_path=output_path,
    sagemaker_session=sess)
# ,
input_mode = 'FastFile' tree.fit('s3://sagemaker-studio-hx4pedpmtjl/training_results/AudioSpeaker_ckp.zip')

@ StreetFighter.zip
duration = (time.time() - start_time)/60 print( "--- training hours : %s minutes ---" % duration )
```

```
51 lines (36 sloc) | 1.03 KB
 1  import boto3
 2  import re
 3  import os
 4  import numpy as np
 5  import pandas as pd
 6  from sagemaker import
 7  import sagemaker as sage
 8  from time import gmtime, strftime
 9
10  prefix = 'sagemaker-studio-hx4pedomtjl"
11
12  role = get_exectution_role()
13
14  sess = sage.session()
15
16  # Cell #6
17
18  # WORK_DIRECTORY = 'lab03_data'
19
20  # data_location = sess.upload_data(WORK_DIRECTORY, key_prefix=prefix)
21
22  # Cell #7
23
24  account = sess.boto_session.client('sts').get_call_identity()['Account']
25  region = sess.boto_session.region_name
26  image = '{}.dkr.ecr.{}.amazonaws.com/sagemaker-ml-render'.format(account, region)
27
28  output_path="s3://{}/output".format(sess.default_bucket())
29
30  print( account )
31  print( region )
32  print( image )
33  print( output_path )
34  # print( data_location )
35
36
37  tree = sage.estimator.Estimator(
38      image,
39      role,
40      instance_count=1,
41      instance_type='ml.g4dn.xlarge',
42      output_path=output_path,
43      sagemaker_session=sess)
44
45  # p4d.24xlarge
46  # p3.16xlarge
47  # p3dn.24xlarge
48  # p3.16xlarge
49
50
51  tree.fit('s3://sagemaker-studio-hx4pedomtjl/inputs/vaseOutDoorsFull.zip')
```

FIG. 8B

CROPPING FOR EFFICIENT THREE-DIMENSIONAL DIGITAL RENDERING

CROSS-REFERENCES TO RELATED APPLICATIONS

This application claims priority to U.S. Provisional Patent Application No. 63/314,169, entitled "Cropping For Efficient Three-Dimensional Digital Rendering," filed on Feb. 25, 2022, the contents of which are hereby incorporated by reference in their entirety for all purposes.

TECHNICAL FIELD

The present disclosure relates to three-dimensional digital image processing, and more particularly to three-dimensional rendering of digital images.

BACKGROUND

Though our environment exists in three dimensions, limitations in technology have previously required that the digital world be experienced primarily through the two-dimensional surface of a screen. This limitation is rapidly evaporating with the propagation of three-dimensional technology and the advent of extended reality (XR) mediums such as augmented reality (AR) and virtual reality (VR). Despite this rapid development, the process for realistically representing real objects in three-dimensions in a digital environment is generally arduous, manual and expensive. This has significantly limited the adoption of three-dimensional technology in e-commerce, industrial design, product visualization and education. Furthermore, three-dimensional representations are required for the technologies that enable experiences in XR, including AR & VR.

SUMMARY

In one aspect, a method for generating a volume for three-dimensional rendering is provided. The method receives a source image input, wherein the source image input is selected from the group consisting of an image set comprising a plurality of images, and a CAD file. The source image input captures a target object. The method extracts a plurality of images from the source image input to obtain extracted images and normalizes the extracted images to obtain normalized images, wherein the normalized images have a common pixel size. For each of the normalized images, the method determines a notional camera placement for that respective normalized image to obtain a plurality of annotated normalized images, wherein each annotated normalized image is annotated with a respective point of view through the view frustum of the notional camera. The method generates, from the annotated normalized images, a first volume encompassing a first three-dimensional representation of the target object. The method selects a subspace within the first volume, wherein the subspace is smaller than the first volume and the subspace encompasses the first three-dimensional representation of the target object. The method generates, from at least a subset of the annotated normalized images, a second volume, which second volume overlaps the first volume and encompasses a second three-dimensional representation of the target object. The second volume includes a plurality of voxels each having a color and an opacity. The method crops the second volume to limit the second volume to the subspace to obtain a cropped volume encompassing the second three-dimensional representation of the target object.

In some embodiments, the source image input is a CAD file, and using a path tracing system, 200 to 400 high-fidelity images are generated.

In some embodiments, the source image input is a video file of at least 1 minute but less than 3 minutes in length, wherein the video file captures the target object from a plurality of view angles and the video file has a frame rate of X frames per second, and images are extracted at every $Y^{th}$ frame, where $Y<X$, to extract a total of 200 to 400 images, with X and Y being variables that are adjustable.

In some embodiments, generating, from at least a subset of the annotated normalized images, the second volume encompassing the second three-dimensional representation of the target object comprises, feeding at least a subset of the annotated normalized images to a view generation engine, generating, by the view generation engine, a plurality of annotated synthetic images, wherein each annotated synthetic image is annotated with a respective point of view, and extrapolating the second volume from the annotated synthetic images.

In some embodiments, the first three-dimensional volume is a point cloud.

In some embodiments, selecting the subspace of the first volume is responsive to a signal received from a user computing device representing a user delineation of the subspace.

In another aspect, a method for generating a volume for three-dimensional rendering is provided. The method comprises transmitting, from a user computing device, at least one source image input, wherein the source image input is selected from the group consisting of a series of images and a CAD file. The source image input captures a target object. The method receives, at the user computing device, a first volume encompassing a first three-dimensional representation of the target object. The first volume is obtained by extracting a plurality of extracted images from the source image input, normalizing the extracted images to obtain normalized images, wherein the normalized images have a common pixel size, for each of the normalized images, determining a notional camera placement for that respective normalized image to obtain a plurality of annotated normalized images, wherein each annotated normalized image is annotated with a respective point of view through the view frustum of the notional camera, and generating the first volume from the annotated images. The method presents, on a display of the user computing device, a visualization of the first volume, and transmits, from the user computing device, a delineation of a subspace within the first volume, wherein the subspace is smaller than the first volume and the subspace encompasses the first three-dimensional representation of the target object.

In some embodiments, the method further comprises receiving, at the user computing device, a cropped volume including a plurality of voxels each having a color and an opacity, wherein the cropped volume is limited to the subspace. The method may yet further comprise rendering the cropped volume at the user computing device. In some such embodiments, the cropped volume may be obtained by generating, from at least a subset of the annotated normalized images, a second volume encompassing the target object, with the second volume overlapping the first volume and encompassing a second three-dimensional representation of the target object and wherein the second volume includes a plurality of voxels each having a color and an opacity, and cropping the second volume to limit the second volume to the subspace to obtain a cropped volume encompassing the second three-dimensional representation of the target object. In some particular embodiments, generating, from at least a subset of the annotated normalized images, a second volume encompassing the target object, comprises feeding at least a subset of the annotated normalized images to a view generation engine, generating, by the view generation engine, a plurality of annotated synthetic images, wherein each annotated synthetic image is annotated with a respective point of view, and extrapolating the second volume from the annotated synthetic images.

In other aspects, the present disclosure is directed to data processing systems and computer program products for implementing the above-described methods.

BRIEF DESCRIPTION OF THE DRAWINGS

These and other features will become more apparent from the following description in which reference is made to the appended drawings wherein:

FIG. 2 shows illustrative code for an illustrative procedure to set up virtual cameras around the target object and render images that are fed into subsequent processing layers;

FIG. 3 shows illustrative code for resizing;

FIG. 4 shows illustrative code for generation of annotations for extracted images;

FIGS. 5A and 5B show illustrative code for generation of a first volume;

FIGS. 8A and 8B show illustrative code for generation of the second volume;

DETAILED DESCRIPTION

Figure 1:
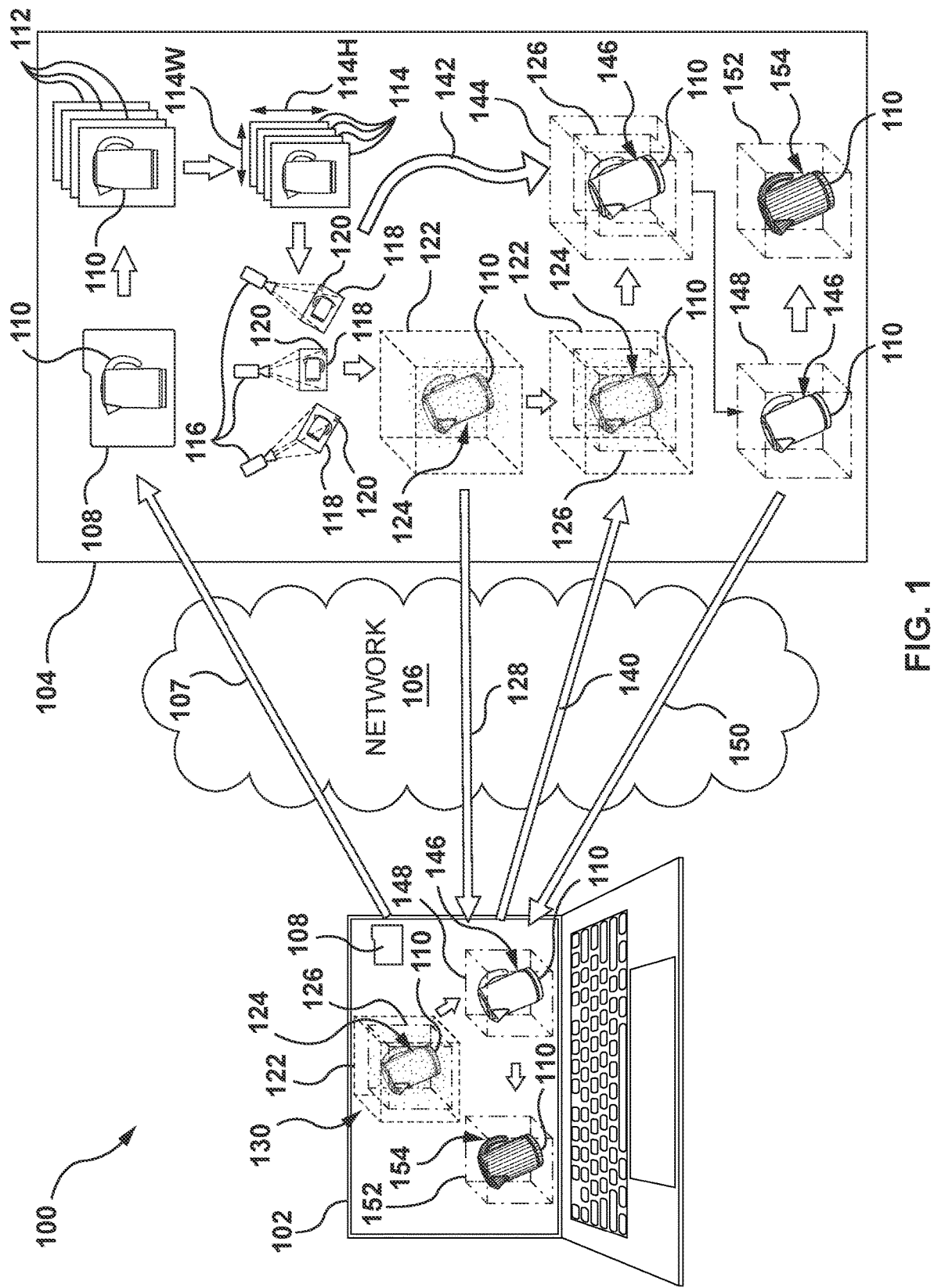
FIG. 1 is a pictorial illustration of a process for generation of a volume for three-dimensional rendering of a target object.

Reference is now made to FIG. 1, which schematically illustrates operation of an illustrative system 100 for generation of a volume for three-dimensional rendering.

The system 100 comprises a user computing device 102 and a server computer system 104 communicatively coupled to one another by a network 106, for example the Internet. While the server computer system 104 is shown as a single computing device for purposes of illustration, the server computer system 104 may comprise a plurality of individual computing devices communicatively coupled together within a data center, or even a plurality of computing devices communicatively coupled together across a plurality of geographically dispersed data centers. For example, and without limitation, the server computer system 104 may be provided by a third party hosting service, for example Amazon Web Services (AWS).

In one illustrative embodiment, the user computing device 102 transmits 107 a source image input 108 to the server computer system 104 through the network 106, and the server computer system 104 receives the source image input 108. The source image input 108 may be, for example, one of an image set, or a computer-aided design (CAD) file. An image set may be a plurality of distinct individual images (e.g. .bmp or .jpg files), or may be a substantially continuous series of images forming a video (e.g. a video file). The source image input 108 captures a target object 110.

In the case of an image set, the target object 110 may be a physical object that exists in the real world, for example and without limitation, a shoe, a car, a toy, a computer or a coffee-maker, and is shown in the Figures as an electric kettle merely for purposes of illustration and without implying any limitation. The images may be images of an actual physical instance of a particular physical object that exists in the physical world. For example, the image set may be distinct individual images showing the target object 110 from multiple angles, or may be a video in which the camera(s) move around the target object. For example, the camera(s) may be located on a smartphone, and a user may walk around the target object 110 while holding the smartphone so as to generally point the camera(s) at the target object 110.

In the case of a CAD file, the target object 110 is a virtual object which is represented in digital form. Such a virtual object may not, or may not yet, exist in the real world, for example a product for which a physical prototype has yet to be made. A virtual object may also represent an idealized or Platonic representation of an object for which there are many actual physical instances, for example a product for which an initial prototype has been produced, or for which hundreds, thousands or even millions of physical instances of the product have been produced.

The server computer system 104 extracts a plurality of images from the source image input 108 to obtain extracted images 112. Where the image set is a plurality of distinct individual images, the extraction step may be trivial, for example simply passing the images on to the next processing layer, or the extraction process may, for example, screen the individual images, e.g. to ensure that the target object 110 appears in its entirety.

Where the source image input 108 is a video file, preferably the video file is of at least 1 minute but less than 3 minutes in length and captures the target object 110 from multiple viewing angles sufficient to represent the surface(s) of the target object 110 for which it is desired to obtain a representation. Not all surfaces need to be represented, for example in some embodiments the bottom of a target object 110 and/or the back of a target object 110 may not be represented. Also preferably, the extraction process will screen the video file to ensure a stable video frame, and to ensure that the entire target object appears in all frames or at least in all extracted frames. In one embodiment, where the video file has a frame rate of X frames per second, images are extracted at every $Y^{th}$ frame, where Y<X, to extract a total of 200 to 400 images. For example, where the video file has a frame rate of 30 frames per second (X=30), images may be extracted at every $5^{th}$ frame (Y=5) to obtain a total of 200 to 400 images. The values of X and Y are variables and are adjustable; a video with a non-constant frame rate X is contemplated, and the value of Y may also be non-constant, or may be algorithmically determined.

In one illustrative embodiment where the source image input 108 is a CAD file, a path tracing system may be used to generate 200 to 400 high-fidelity images. Thus, as used in this context, the term "extract" and related terms include generation of images from a CAD file. A programmatic environment may be created with multiple virtual cameras aiming at the target object 110, that is, the virtual object defined in the CAD file, and using this environment, a plurality of images are generated to be used in subsequent steps of the method 100. For example, for the Maya® software offered by Autodesk, Inc. having an address at 111 McInnis Parkway, San Rafael, California 94903, using the Python programming language, this environment is set up using the procedure 200 shown in FIG. 2. The Maya® software is used in creating, rendering, executing and displaying animation, visual effects, video and computer games, and digital media content. The procedure 200 shown in FIG. 2 sets up the virtual cameras around the target object 110 and renders images that are fed into subsequent processing layers.

While examples above have described the use of 200 to 400 extracted images 112, this represents merely one illustrative embodiment and is not intended to be limiting; other embodiments may use a greater number of extracted images or fewer extracted images.

The server computer system 104 normalizes the extracted images 112 to obtain normalized images 114. In some instances, the extracted images are normalized using one or more parameters specified by a user. The normalized images can have a common pixel size, that is, a consistent height 114H and a consistent width 114W, measured in pixels. In one illustrative embodiment, the common pixel size is 800×800 pixels; this is merely one illustrative embodiment and other pixel sizes may also be used.

In one illustrative implementation, resizing may be carried out using the Python procedure 300 shown in FIG. 3.

Note that in embodiments in which the source image input 108 is a CAD file, the normalization step may be subsumed within the extraction step; that is, the server computer system 104 may normalize the extracted images to obtain normalized images by extracting (generating) normalized images having a common pixel size.

Next, for each of the normalized images 114, the server computer system 104 determines placement of a notional camera 116 for that respective normalized image 114 to obtain a plurality of annotated normalized images 118. Each annotated normalized image 118 is annotated 120 with a respective point of view through the view frustum of the notional camera 116. As used in this context, the term "point of view" refers to the apex of a notional right pyramid whose base is the normalized image; the base of the notional right pyramid is coincident with the normalized image 116.

In one embodiment using the NumPy and Pandas libraries as well as a trained machine learning model implemented using the Amazon SageMaker® service offered via Amazon Web Services® by Amazon Technologies, Inc. having an address at 410 Terry Avenue N, Seattle, Washington 98109, generation of the annotation for each normalized image may be carried out by the procedure 400 shown in FIG. 4. Amazon SageMaker® is used to provision computing environments and resources (GPU-powered machines). It is also used to manage the execution of the algorithms and monitor their progress, errors and outputs.

The server computer system 104 generates, from the annotated normalized images 118, a first volume 122 encompassing a first three-dimensional representation 124 of the target object 110. In some embodiments, the first volume 122 is a point cloud, which may be a monochrome point cloud, or a colored point cloud.

In one illustrative embodiment using a trained machine learning model implemented using Amazon SageMaker®, generation of the first volume 122 is achieved by the procedure 500 shown in FIGS. 5A and 5B.

The server computer system 104 selects a subspace 126 within the first volume 122. The subspace 126 is smaller than the first volume 122 and the subspace 126 encompasses the three-dimensional representation 124 of the target object 110. In one preferred embodiment, the selection of the subspace 126 of the first volume 122 is responsive to a signal received from the user computing device 102 representing a user delineation of the subspace 126. In some instances, the user delineation of the subspace includes modifying one or more dimensions of the first volume based on user input (e.g., scaling of the first volume). For example, the user input can include identifying a set of values that represent the subspace within the first volume, in which subspace be represented by the modified dimensions of the first volume. In some instances, the user delineation of the subspace can be represented as a bounding box comprising a set of edges. The user delineation of the subspace can thus depict the bounding box over the first three-dimensional representation of the target object, at which the user can define the subspace by dragging one or more edges of the set of edges.

In an embodiment with user delineation of the subspace 126, the server computer system 104 transmits 128 the first volume 122 to the user computing device 102 through the network 106. A visualization 130 of the first volume 122 is presented on a display of the user computing device 102. Equivalently to transmitting the first volume 122 to the user computing device, the server computer system 104 may merely transmit to the user computing device 102 sufficient information to enable visualization 130 of the first volume 122, without actually transmitting the first volume 122.

Figure 6:
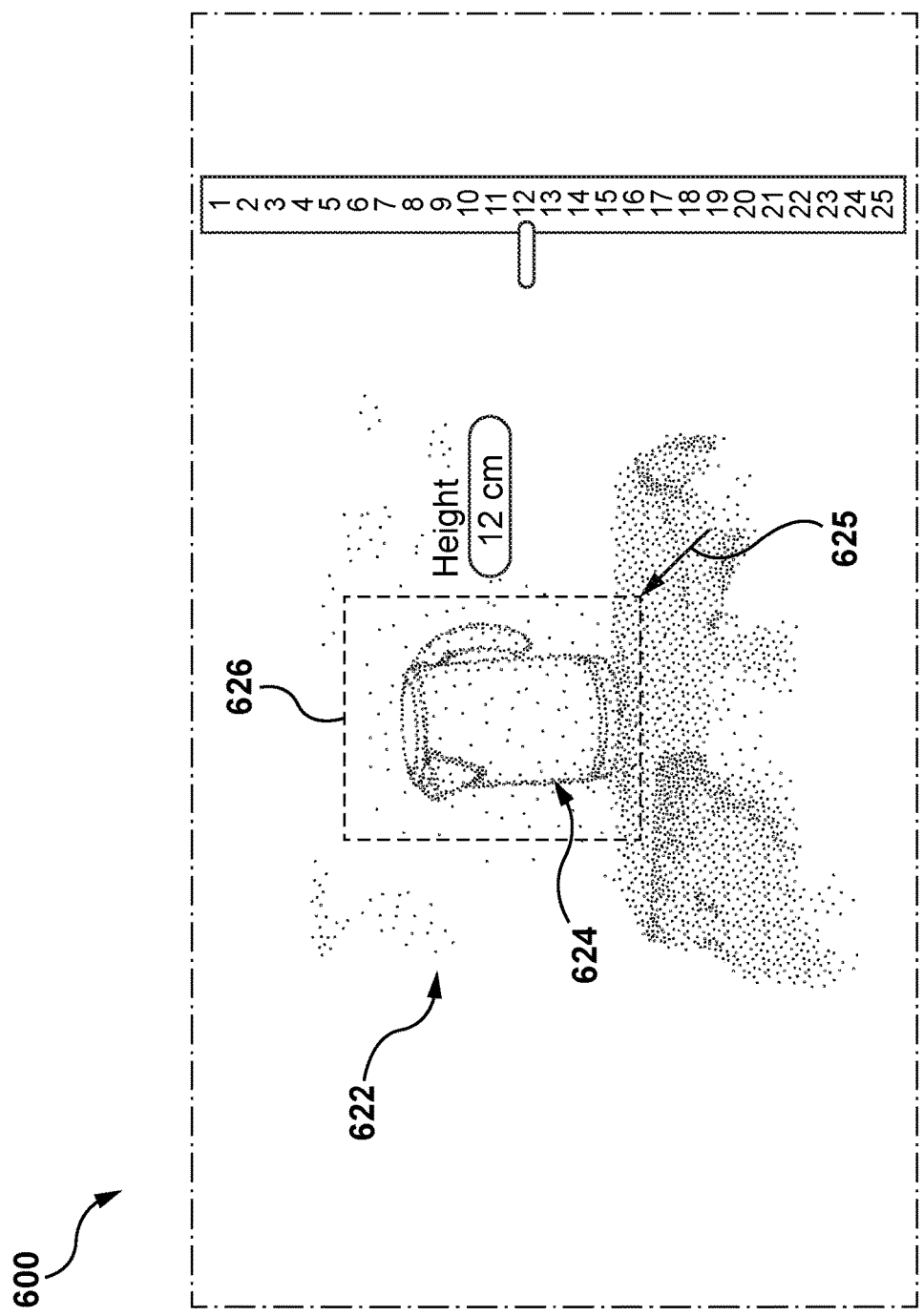
FIG. 6 shows an illustrative user interface for receiving user input for selecting a subspace.

For example, the display of the user computing device 102 may present views of the first volume 122 which present at least a side elevation view of the target object 110 and a top plan view of the target object 110, and permit a user to place a rectangle, circle or other suitable shape around the target object 110 in each view. In some embodiments, there may be additional views, e.g. there may be views of the first volume 122 presenting a front and/or rear elevation view of the target object 110, and/or a bottom plan view of the target object 110, among others. FIG. 6 shows a non-limiting illustrative user interface 600 for receiving user input for selecting a subspace 126. The user interface 600 displays a visual representation 622 of the first volume 122 which includes a depiction 624 of the three-dimensional representation 124 of the target object 110. The user can use a pointer to draw an envelope 626 encompassing the depiction 624 to identify the subspace 126.

The user computing device 102 transmits 140 the delineation of the subspace 126 within the first volume 122 through the network 106 to the server computer system 104. Alternatively, selection of the subspace 126 of the first volume 122 may occur without user intervention, for example by execution of a trained machine learning engine on the server computer system 104.

Figure 7:
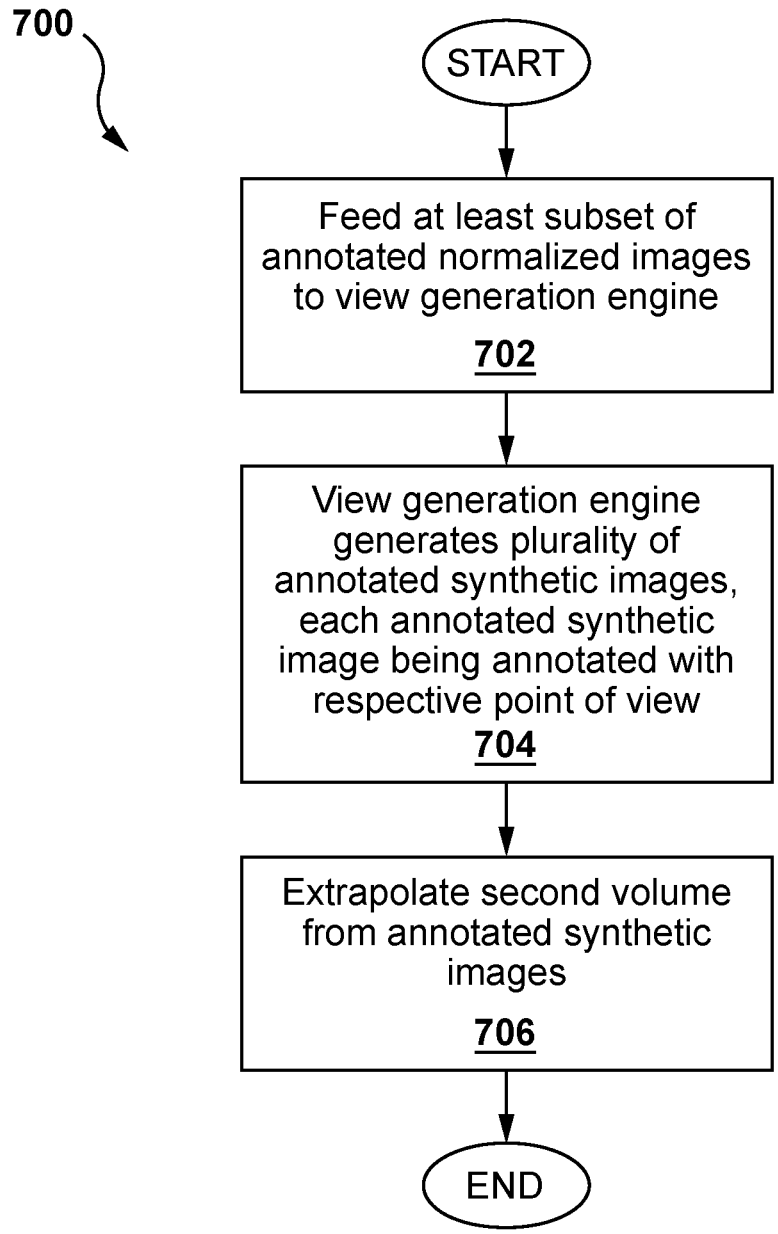
FIG. 7 is a flow chart showing an illustrative method for generating a second volume of the target object.

The server computer system 104 generates 142, from at least a subset of the annotated normalized images 118, a second volume 144. All of the annotated normalized images 118, or fewer than all of the annotated normalized images 118, may be used in generating the second volume 144. The second volume 144 overlaps the first volume 122 and encompasses a second three dimensional representation 146 of the target object 110. The second volume 144 includes a plurality of voxels having each having a color and an opacity. FIG. 7 shows one illustrative method 700 for generating the second volume. At step 702, the method 700 feeds at least a subset of the annotated normalized images to a view generation engine. At step 704, the view generation engine generates a plurality of annotated synthetic images, with each annotated synthetic image being annotated with a respective point of view, and at step 706, the method 700 extrapolates the second volume from the annotated synthetic images. In some instances, the view generation engine includes one or more image-processing algorithms that are configured to generate the plurality of annotated synthetic images. Additionally or alternatively, the one or more image-processing algorithms includes one or more machine-learning models that processes the annotated normalized images to generate the plurality of annotated synthetic images. The annotated synthetic images can be used to generate, for a second volume, a three-dimensional rendering of the target object.

The second volume may be generated, for example, and without limitation, by use of a suitably adapted Neural Rendering Field ("NeRF") approach.

One example of a suitable NeRF approach is described in i NeRF: Representing Scenes as Neural Radiance Fields for View Synthesis, by Ben Mildenhall, Pratul P. Srinivasan, Matthew Tancik, Jonathan T. Barron, Ravi Ramamoorthi and Ren Ng, *Communications of the ACM*, January 2022, Vol. 65 No. 1, Pages 99-106, available at (https://cacm.acm.org/magazines/2022/1/257450-nerf/fulltext) and hereby incorporated by reference in its entirety. This approach uses a sparse set of input views, and optimizes a continuous volumetric scene function to create novel synthetic views of a scene using a fully-connected (non-convolutional) deep network. The input to the network is a single continuous five-dimensional coordinate made up of the conventional three-dimensional spatial coordinates (x,y, z) as well as the viewing direction (θ,φ). The output of the network will be the volume density and view-dependent emitted radiance at the specified spatial location (x,y,z).

Another example of a suitable NeRF approach is described in *PlenOctrees: For Real—time Rendering of Neural Radiance Fields, August* 2021, by Alex Yu, Ruilong Li, Matthew Tancik, Hao Li, Ren Ng, and Angjoo Kanazawa available at (https://arxiv.org/pdf/2103.14024.pdf) and hereby incorporated by reference in its entirety. Code for the PlenOctrees approach is available at (https://github.com/sxyu/plenoctree) and this code is also hereby incorporated by reference in its entirety. The PlenOctrees approach is particularly well suited to situations in which the source image input 108 is a video file or a CAD file.

The foregoing are merely examples of approaches for generating the second volume, and are not intended to be limiting; other suitable techniques may also be used.

In one illustrative embodiment, generation of the second volume is executed by the procedure 800 shown in FIGS. 8A and 8B.

The server computer system 104 crops the second volume 144 to limit the second volume 144 to the subspace 126 to obtain a cropped volume 148 encompassing the second three-dimensional representation 146 of the target object 110. The cropped volume 148 is limited to the subspace 126. Because it is cropped from the second volume 144, the cropped volume 148 also includes a plurality of voxels each having a color and an opacity; this is a subset of the voxels from the second volume 144. Cropping the second volume 144 reduces the processing load; rendering the relatively smaller cropped volume 148 requires fewer processing resources than rendering the entire second volume 144.

In one embodiment, the server computer system 104 transmits 150 the cropped volume 148 through the network 106 to the user computing device 102, which receives the cropped volume 148. The cropped volume 148 includes a plurality of voxels each having a color and an opacity, and the user computing device 102 can then render the cropped volume 148 to produce a rendered cropped volume 152 including a rendered three-dimensional model 154 of the target object 110. Any suitable rendering technique may be used. Alternatively, the server computer system 104 can render the cropped volume 148 to produce a rendered cropped volume 152 including a rendered three-dimensional model 154 of the target object 110.

Figure 9:
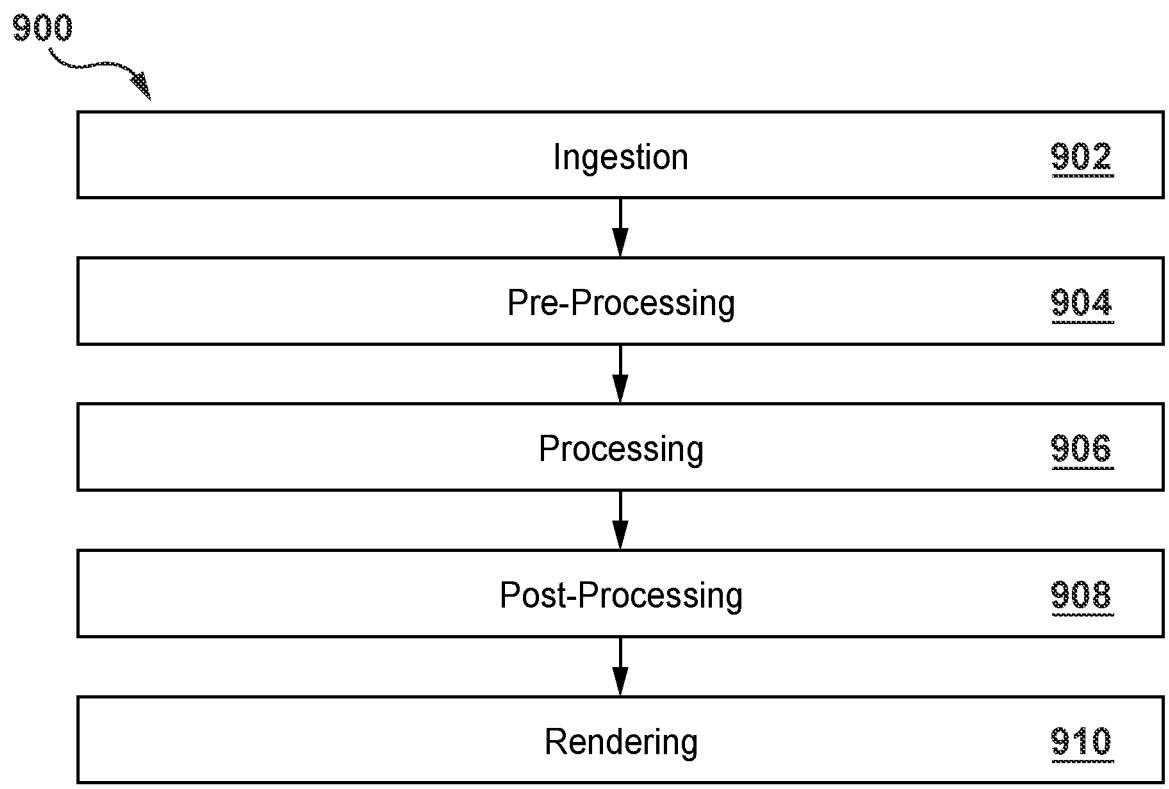
FIG. 9 shows a general tiered architecture for generating a volume for three-dimensional rendering.

FIG. 9 shows a general tiered architecture 900 for generating a volume for three-dimensional rendering according to an aspect of the present disclosure. The tiered architecture 900 comprises an ingestion tier 902, a pre-processing tier 904, a processing tier 906, a post-processing tier 908 and a rendering tier 910. The general tiered architecture 900 may be adapted for use with source image input such as discrete images, video, and three-dimensional digital models, as described further below. The ingestion tier 902 receives the source image input, and the pre-processing tier 904 operates on the incoming source image input to make the source image input suitable for the processing tier 906, where artificial intelligence methods are used to generate a representation of the target object. View synthesis algorithms, such as NeRF and PlenOctrees as described above, among others, may be used in the processing tier 906. The post-processing tier 908 is dependent upon the output of the processing tier 906, and is applied to optimize the representation. The amalgamated output is then presented through mechanisms suitable for the medium of consumption in the rendering tier 910. Within each tier, there may exist multiple methodologies arranged in layers. The layers depend on the type of source image input and the target medium for rendering.

Figure 9A:
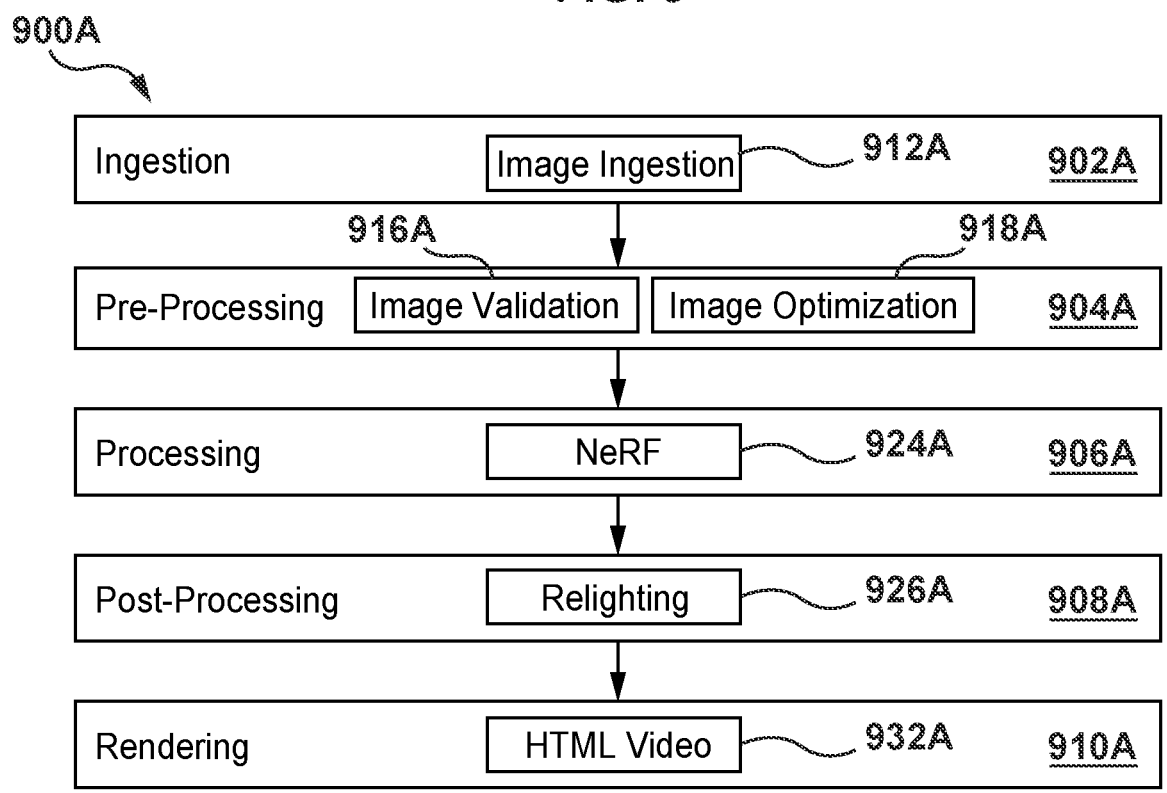
FIG. 9A shows a tiered architecture for generating a volume for three-dimensional rendering from discrete images.
Figure 9B:
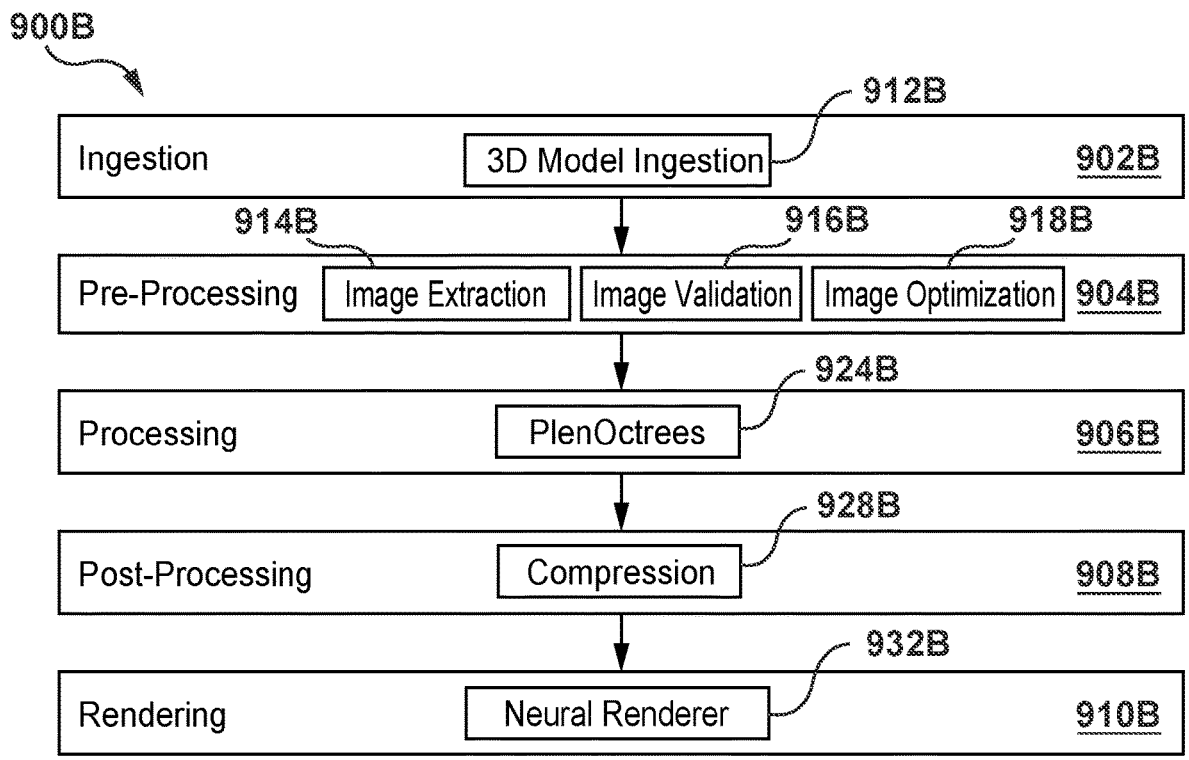
FIG. 9B shows a tiered architecture for generating a volume for three-dimensional rendering from video.

FIG. 9A shows a tiered architecture 900A for generating a volume for three-dimensional rendering from discrete images. The tiered architecture 900A comprises an ingestion tier 902A, a pre-processing tier 904A, a processing tier 906A, a post-processing tier 908A and a rendering tier 910A. The ingestion tier 902A includes a single image ingestion layer 912A that receives discrete images, and the pre-processing tier 904A includes an image validation layer 916A and an image optimization layer 918A. The image optimization layer 918A may perform resizing and/or compression to prepare the images for the processing tier 906A. The processing tier 906A includes a NeRF layer 924A, the output of which may be a video that is fed to the post-processing tier 908A. The post-processing tier 908A may include a relighting layer 926A adapted to generate perspectives from novel viewpoints under arbitrary lighting conditions, which can then be fed to the rendering tier 910A, which includes an HTML video layer 932A FIG. 9B shows a tiered architecture 900B for generating a volume for three-dimensional rendering from video. The tiered architecture 900B comprises an ingestion tier 902B, a pre-processing tier 904B, a processing tier 906B, a post-processing tier 908B and a rendering tier 910B. The ingestion tier 902B includes a video ingestion layer 912B for receiving video files, and the pre-processing tier 904B includes an image extraction layer 914B for extracting images from a video file, an image validation layer 916B and an image optimization layer 918B. The image optimization layer 918B may perform resizing and compression. The processing tier 906B includes a PlenOctrees layer 924B, the output of which may be a neural volume that is fed to the post-processing tier 908B. The post-processing tier 908B includes a compression layer 928B to generate a three-dimensional representation from the neural volume, and the rendering tier 910B includes a neural renderer layer 932B to render the representation, for example for presentation in a web browser or augmented reality. For example, in some embodiments the processing tier 906B and the post-processing tier 908B may be adapted to a suitably modified form of the PlenOctrees viewer, which may form part of the rendering tier 910B.

Figure 9C:
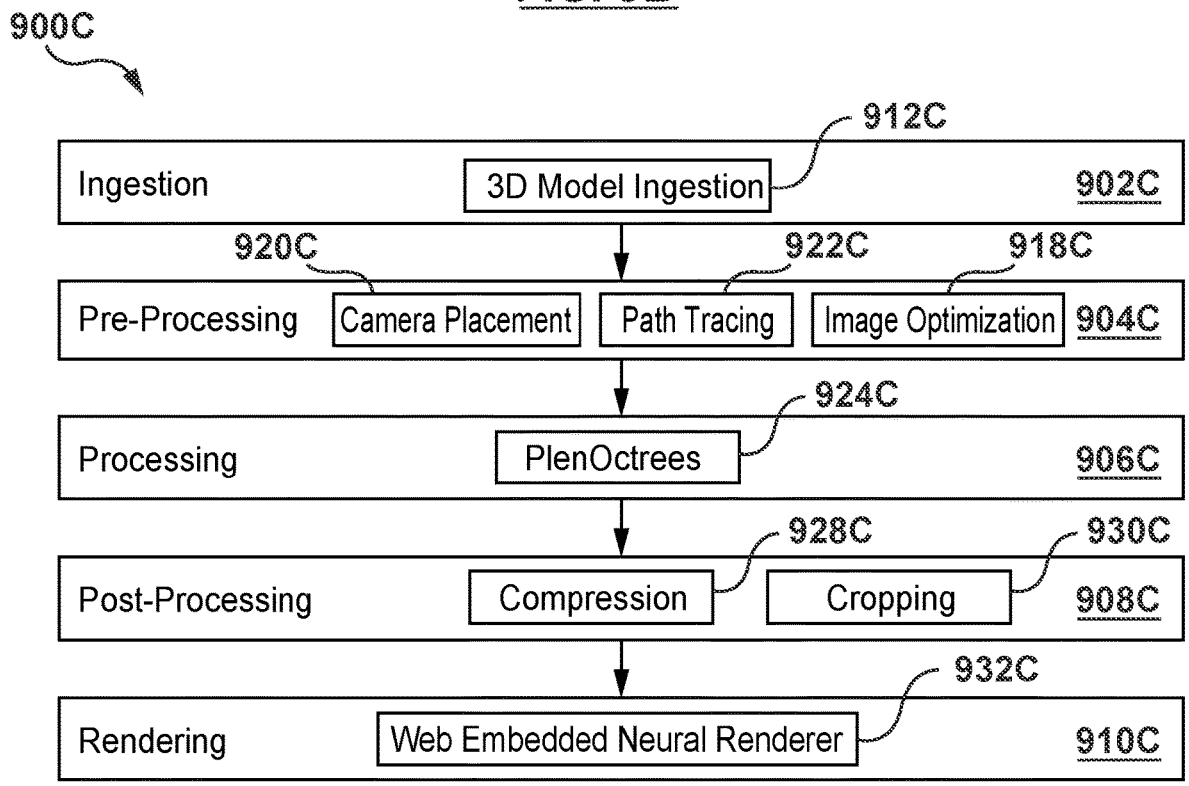
FIG. 9C shows a tiered architecture for generating a volume for three-dimensional rendering from a three-dimensional digital model.

FIG. 9C shows a tiered architecture 900C for generating a volume for three-dimensional rendering from a three-dimensional digital model (e.g. a CAD file). The tiered architecture 900C comprises an ingestion tier 902C, a pre-processing tier 904C, a processing tier 906C, a post-processing tier 908C and a rendering tier 910C. The ingestion tier 902C includes a model ingestion layer 912C for ingesting three-dimensional model files. While a single model ingestion layer 912C is shown, there may be a plurality of different model ingestion layers, each adapted to a particular CAD file format. The pre-processing tier 904C includes a camera placement layer 920C for placing virtual cameras in predetermined positions and a path tracing layer 922C that performs path tracing using the virtual camera positions to generate images, which are fed to an image optimization layer 918C. The processing tier 906C includes a PlenOctrees layer 924C, which outputs a neural volume, which is fed to the post-processing tier 908C, which includes a compression layer 928C and a cropping layer 930C. The compression layer 928C allows for optimization and the cropping layer 930C allows for customization. The rendering tier 910C includes a neural renderer layer 932C. For example, in some embodiments the processing tier 906C and the post-processing tier 908C may be adapted to a suitably modified form of the PlenOctrees viewer, which may form part of the rendering tier 910C.

One potential application for the image processing technology described herein is in the area of online retail. An online retailer may sign up to a platform implementing the presently-described technology using cloud computing, and create an account to host one or more three-dimensional representations of items, which may be tracked by Stock-Keeping Units (SKUs). An SKU is an alphanumeric code, often represented as a bar code, which tracks product details. Within their web account, the retailer will have an option to create a three-dimensional digital representation of the product for a new (or existing) product SKU. An interface may be provided to guide the user through the upload of source image input 108 such as video clips, CAD data or photos. The first volume 122 can be presented to the user, for example in a three-dimensional web viewer, and a data validation phase may be provided to identify issues, for example areas of low data collection. Optionally a user may choose to re-generate the first volume 122. Once satisfied with the quality of the first volume 122, the user selects a subspace 126 within the first volume 122, for example using the interface shown in FIG. 6. Once the rendered cropped volume 152, including the rendered three-dimensional model 154 of the target object 110, is ready, the user can be notified. The rendered cropped volume 152 can be made available via a web link, which can be embedded into a web iFrame or rendered through a custom mobile engine.

As can be seen from the above description, the image processing technology described herein represents significantly more than merely using categories to organize, store and transmit information and organizing information through mathematical correlations. The image processing technology is in fact an improvement to the technology of three dimensional rendering, as it reduces the number of voxels to be rendered by cropping the second volume. This facilitates a reduction in processing load since rendering the smaller number of voxels in the cropped volume requires fewer processing resources than would be required for rendering the entire second volume. As such, the image processing technology is confined to three-dimensional rendering applications.

The present technology may be embodied within a system, a method, a computer program product or any combination thereof. The computer program product may include a computer readable storage medium or media having computer readable program instructions thereon for causing a processor to carry out aspects of the present technology. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present technology may be assembler instructions, instruction-set-architecture (ISA) instructions, machine instructions, machine dependent instructions, microcode, firmware instructions, state-setting data, or either source code or object code written in any combination of one or more programming languages, including an object oriented programming language or a conventional procedural programming language. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to implement aspects of the present technology.

Aspects of the present technology have been described above with reference to flowchart illustrations and/or block diagrams of methods, apparatus (systems) and computer program products according to various embodiments. In this regard, the flowchart and block diagrams in the Figures illustrate the architecture, functionality, and operation of possible implementations of systems, methods and computer program products according to various embodiments of the present technology. For instance, each block in the flowchart or block diagrams may represent a module, segment, or portion of instructions, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Some specific examples of the foregoing may have been noted above but any such noted examples are not necessarily the only such examples. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, other programmable data processing apparatus, or other devices to function in a particular manner, such that the instructions stored in the computer readable storage medium produce an article of manufacture including instructions which implement aspects of the functions/acts specified in the flowchart and/or block diagram block or blocks. The computer readable program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 10:
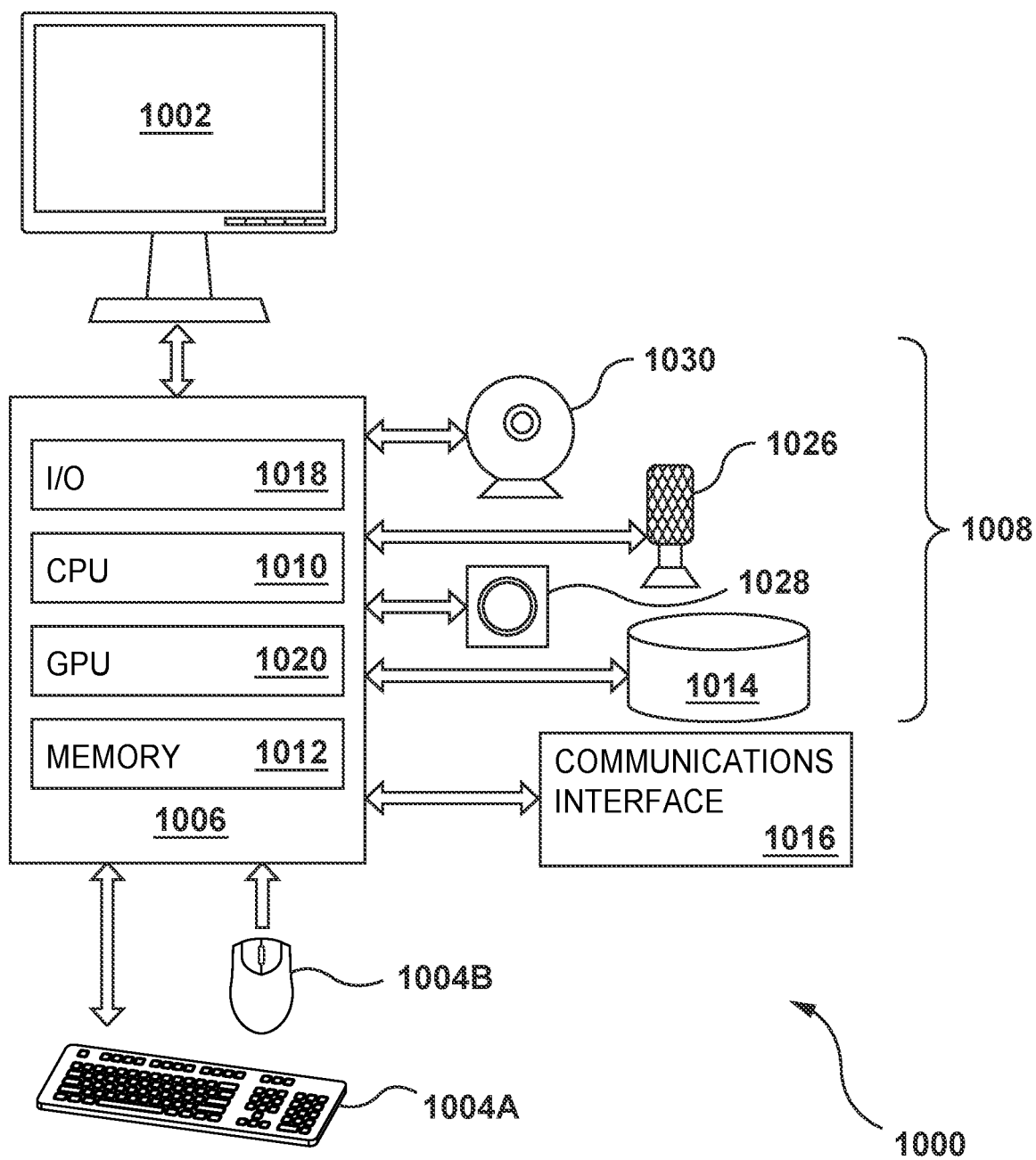
FIG. 10 is an illustrative computer system in respect of which the technology herein described may be implemented.

An illustrative computer system in respect of which the technology herein described may be implemented is presented as a block diagram in FIG. 10. The illustrative computer system is denoted generally by reference numeral 1000 and includes a display 1002, input devices in the form of keyboard 1004A and pointing device 1004B, computer 1006 and external devices 1008. While pointing device 1004B is depicted as a mouse, it will be appreciated that other types of pointing device, or a touch screen, may also be used.

The computer 1006 may contain one or more processors or microprocessors, such as a central processing unit (CPU) 1010. The CPU 1010 performs arithmetic calculations and control functions to execute software stored in an internal memory 1012, preferably random access memory (RAM) and/or read only memory (ROM), and possibly additional memory 1014. The additional memory 1014 may include, for example, mass memory storage, hard disk drives, optical disk drives (including CD and DVD drives), magnetic disk drives, magnetic tape drives (including LTO, DLT, DAT and DCC), flash drives, program cartridges and cartridge interfaces such as those found in video game devices, removable memory chips such as EPROM or PROM, emerging storage media, such as holographic storage, or similar storage media as known in the art. This additional memory 1014 may be physically internal to the computer 1006, or external as shown in FIG. 10, or both.

The computer system 1000 may also include other similar means for allowing computer programs or other instructions to be loaded. Such means can include, for example, a communications interface 1016 which allows software and data to be transferred between the computer system 1000 and external systems and networks. Examples of communications interface 1016 can include a modem, a network interface such as an Ethernet card, a wireless communication interface, or a serial or parallel communications port. Software and data transferred via communications interface 1016 are in the form of signals which can be electronic, acoustic, electromagnetic, optical or other signals capable of being received by communications interface 1016. Multiple interfaces, of course, can be provided on a single computer system 1000.

Input and output to and from the computer 1006 is administered by the input/output (I/O) interface 1018. This I/O interface 1018 administers control of the display 1002, keyboard 1004A, external devices 1008 and other such components of the computer system 1000. The computer 1006 also includes a graphical processing unit (GPU) 1020. The latter may also be used for computational purposes as an adjunct to, or instead of, the (CPU) 1010, for mathematical calculations.

The external devices 1008 include a microphone 1026, a speaker 1028 and a camera 1030. Although shown as external devices, they may alternatively be built in as part of the hardware of the computer system 1000.

The various components of the computer system 1000 are coupled to one another either directly or by coupling to suitable buses.

Figure 11:
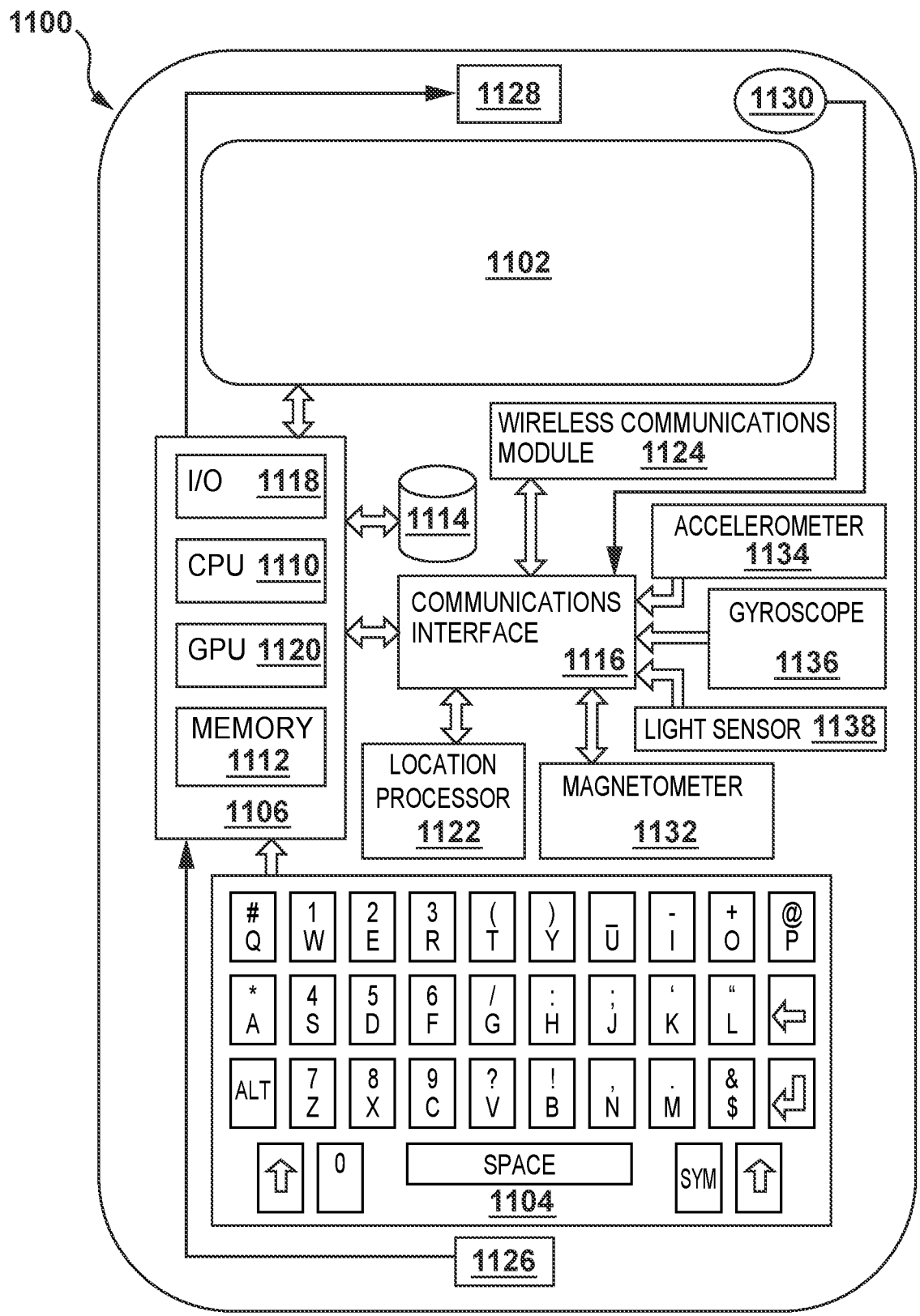
FIG. 11 shows an illustrative networked mobile wireless telecommunication computing device in the form of a smartphone.

FIG. 11 shows an illustrative networked mobile wireless telecommunication computing device in the form of a smartphone 1100. In some embodiments, user computing device 102 may be a smartphone. The smartphone 1100 includes a display 1102, an input device in the form of keyboard 1104 and an onboard computer system 1106. The display 1102 may be a touchscreen display and thereby serve as an additional input device, or as an alternative to the keyboard 1104. The onboard computer system 1106 comprises a central processing unit (CPU) 1110 having one or more processors or microprocessors for performing arithmetic calculations and control functions to execute software stored in an internal memory 1112, preferably random access memory (RAM) and/or read only memory (ROM) is coupled to additional memory 1114 which will typically comprise flash memory, which may be integrated into the smartphone 1100 or may comprise a removable flash card, or both. The smartphone 1100 also includes a communications interface 1116 which allows software and data to be transferred between the smartphone 1100 and external systems and networks. The communications interface 1116 is coupled to one or more wireless communication modules 1124, which will typically comprise a wireless radio for connecting to one or more of a cellular network, a wireless digital network or a Wi-Fi network. The communications interface 1116 will also typically enable a wired connection of the smartphone 1100 to an external computer system. A microphone 1126 and speaker 1128 are coupled to the onboard computer system 1106 to support the telephone functions managed by the onboard computer system 1106, and a location processor 1122 (e.g. including GPS receiver hardware) may also be coupled to the communications interface 1116 to support navigation operations by the onboard computer system 1106. One or more cameras 1130 (e.g. front-facing and/or rear facing cameras) may also be coupled to the onboard computer system 1106, as may be one or more of a magnetometer 1132, accelerometer 1134, gyroscope 1136 and light sensor 1138. The camera(s) 1130 may be used, for example, to capture a video, or a series of discrete images, to form the source image input for the target object 110. Input and output to and from the onboard computer system 1106 is administered by the input/output (I/O) interface 1118, which administers control of the display 1102, keyboard 1104, microphone 1126, speaker 1128, camera 1130, magnetometer 1132, accelerometer 1134, gyroscope 1136 and light sensor 1138. The onboard computer system 1106 may also include a separate graphical processing unit (GPU) 1120. The various components are coupled to one another either directly or by coupling to suitable buses.

The term "computer system", "data processing system" and related terms, as used herein, is not limited to any particular type of computer system and encompasses servers, desktop computers, laptop computers, networked mobile wireless telecommunication computing devices such as smartphones, tablet computers, as well as other types of computer systems.

Thus, computer readable program code for implementing aspects of the technology described herein may be contained or stored in the memory 1112 of the onboard computer system 1106 of the smartphone 1100 or the memory 1012 of the computer 1006, or on a computer usable or computer readable medium external to the onboard computer system 1106 of the smartphone 1100 or the computer 1006, or on any combination thereof.

Finally, the terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description has been presented for purposes of illustration and description, but is not intended to be exhaustive or limited to the form disclosed. Many modifications and variations will be apparent to those of ordinary skill in the art without departing from the scope of the claims. The embodiment was chosen and described in order to best explain the principles of the technology and the practical application, and to enable others of ordinary skill in the art to understand the technology for various embodiments with various modifications as are suited to the particular use contemplated.

One or more currently preferred embodiments have been described by way of example. It will be apparent to persons skilled in the art that a number of variations and modifications can be made without departing from the scope of the claims. In construing the claims, it is to be understood that the use of a computer to implement the embodiments described herein is essential.

What is claimed is:

1. A method for generating a volume for three-dimensional rendering, the method comprising:
   receiving a plurality of images, wherein each image of the plurality of images depicts a target object from a particular view angle of a plurality of view angles;
   for each of the plurality of images, determining a notional camera placement for the image to obtain a plurality of annotated images, wherein each annotated image of the plurality of annotated images is annotated with a respective point of view of the target object based on the corresponding notional camera placement;
   generating, from the plurality of annotated images, a first volume encompassing a first three-dimensional representation of the target object;
   selecting a subspace within the first volume, wherein the subspace is smaller than the first volume and the subspace encompasses the first three-dimensional representation of the target object;
   generating, from at least a subset of the plurality of annotated images, a second volume, the second volume overlapping the first volume and encompassing a second three-dimensional representation of the target object; and
   cropping the second volume to limit the second volume to the subspace to obtain a cropped volume encompassing the second three-dimensional representation of the target object, wherein the cropped volume is rendered at a computing device.

2. The method of claim 1, wherein the plurality of images are extracted from a source image input, and wherein:

the source image input is a CAD file; and
using a path tracing system, a plurality of high-fidelity images are generated, wherein the plurality of images are selected from the plurality of high-fidelity images.

3. The method of claim 1, wherein the plurality of images are extracted from a source image input, and wherein:
the source image input is a video file, wherein the video file captures the target object from the plurality of view angles; and
the plurality of images are selected from images extracted from the video file, wherein each image extracted from the video file is associated with the particular view angle of the plurality of view angles.

4. The method of claim 1, wherein generating, from at least a subset of the plurality of annotated images, the second volume encompassing the second three-dimensional representation of the target object comprises:
providing at least a subset of the plurality of annotated images to a view generation engine, wherein the view generation engine generates a plurality of annotated synthetic images, wherein each annotated synthetic image is annotated with a respective point of view; and
extrapolating the second volume from the plurality of annotated synthetic images.

5. The method of claim 1, wherein the first volume is a point cloud.

6. The method of claim 1, wherein selecting the subspace of the first volume is responsive to a signal received from a user computing device representing a user delineation of the subspace.

7. The method of claim 1, wherein determining the notional camera placement of the image includes:
transforming the image to have a specified width and height to generate a normalized image; and
determining the notional camera placement from the normalized image.

8. The method of claim 1, wherein the second volume includes a plurality of voxels each having a color and an opacity.

9. A method for generating a volume for three-dimensional rendering, the method comprising:
transmitting, from a user computing device, a plurality of images, wherein each image of the plurality of images depicts a target object from a particular view angle of a plurality of view angles;
receiving, at the user computing device, a first volume encompassing a first three-dimensional representation of the target object, wherein the first volume is obtained by:
for each of the plurality of images, determining a notional camera placement for the image to obtain a plurality of annotated images, wherein each annotated image of the plurality of annotated images is annotated with a respective point of view of the target object based on the corresponding notional camera placement; and
generating the first volume from the plurality of annotated images;
presenting, on a display of the user computing device, a visualization of the first volume;
transmitting, from the user computing device, a delineation of a subspace within the first volume, wherein the subspace is smaller than the first volume and the subspace encompasses the first three-dimensional representation of the target object;
receiving, at the user computing device, a cropped volume encompassing a second three-dimensional representation of the target object, wherein the cropped volume is limited to the subspace; and
rendering, at the user computing device, the cropped volume.

10. The method of claim 9, wherein the cropped volume is obtained by:
generating, from at least a subset of the plurality of annotated images, a second volume encompassing the target object, wherein the second volume overlapping the first volume and encompassing the second three-dimensional representation of the target object; and
cropping the second volume to limit the second volume to the subspace to obtain the cropped volume.

11. The method of claim 10, wherein generating, from at least a subset of the plurality of annotated images, the second volume encompassing of the target object, comprises:
providing at least a subset of the plurality of annotated images to a view generation engine, wherein the view generation engine generates a plurality of annotated synthetic images, wherein each annotated synthetic image is annotated with a respective point of view; and
extrapolating the second volume from the plurality of annotated synthetic images.

12. The method of claim 11, wherein the second volume includes a plurality of voxels each having a color and an opacity.

13. The method of claim 9, wherein the plurality of images are extracted from a source image input, and wherein:
the source image input is a CAD file; and
using a path tracing system, 200 to 400 high-fidelity images are generated, wherein the plurality of images are selected from the 200 to 400 high-fidelity images.

14. The method of claim 9, wherein the plurality of images are extracted from a source image input, and wherein:
the source image input is a video file, wherein the video file captures the target object from the plurality of view angles; and
the plurality of images are selected from images extracted from the video file, wherein each image extracted from the video file is associated with the particular view angle of the plurality of view angles.

15. A data processing system comprising at least one processor and a memory coupled to the at least one processor, the memory containing instructions which, when executed by the at least one processor, cause the at least one processor to perform:
receiving a source image input, wherein the source image input is selected from the group consisting of:
an image set comprising a plurality of images; and
a CAD file;
wherein the source image input captures a target object;
extracting the plurality of images from the source image input to obtain extracted images;
normalizing the extracted images to obtain normalized images, wherein the normalized images have a common pixel size;
for each of the normalized images, determining a notional camera placement for that respective normalized image to obtain a plurality of annotated normalized images, wherein each annotated normalized image is annotated with a respective point of view through a view frustum of a notional camera;

generating, from the annotated normalized images, a first volume encompassing a first three-dimensional representation of the target object;

selecting a subspace within the first volume, wherein the subspace is smaller than the first volume and the subspace encompasses the first three-dimensional representation of the target object;

generating, from at least a subset of the annotated normalized images, a second volume, the second volume overlapping the first volume and encompassing a second three-dimensional representation of the target object;

wherein the second volume includes a plurality of voxels each having a color and an opacity; and cropping the second volume to limit the second volume to the subspace to obtain a cropped volume encompassing the second three-dimensional representation of the target object.

16. The data processing system of claim 15, wherein:
the source image input is a CAD file; and
using a path tracing system, 200 to 400 high-fidelity images are generated.

17. The data processing system of claim 15, wherein:
the source image input is a video file, and wherein:
the video file is of at least 1 minute but less than 3 minutes in length;
the video file captures the target object from a plurality of view angles; and
the video file has a frame rate of X frames per second; and
images are extracted at every $Y^{th}$ frame, where Y<X, to extract a total of 200 to 400 images.

18. The data processing system of claim 15, wherein generating, from at least a subset of the plurality of annotated normalized images, the second volume encompassing the second three-dimensional representation of the target object comprises:
providing at least a subset of the plurality of annotated normalized images to a view generation engine, wherein the view generation engine generates a plurality of annotated synthetic images, wherein each annotated synthetic image is annotated with a respective point of view; and
extrapolating the second volume from the plurality of annotated synthetic images.

19. The data processing system of claim 15, wherein the first volume is a point cloud.

20. The data processing system of claim 15, wherein selecting the subspace of the first volume is responsive to a signal received from a user computing device representing a user delineation of the subspace.

* * * * *